United States Patent Office 3,175,013
Patented Mar. 23, 1965

3,175,013
REMOVAL OF CYCLOPENTADIENE FROM ALIPHATIC HYDROCARBONS BY SELECTIVE CLATHRATION WITH NICKEL TETRA-(GAMMA-PICOLINE) DITHIOCYANATE
Clifford E. Smith, Bartlesville, Okla., assignor to Phillips Petroleum Company, a corporation of Delaware
No Drawing. Filed Nov. 28, 1960, Ser. No. 71,905
8 Claims. (Cl. 260—666)

This invention relates to the separation of cyclopentadiene from an aliphatic hydrocarbon. In one of its aspects, the invention relates to a method of separating cyclopentadiene from an aliphatic hydrocarbon from which it is difficultly separable by employing selective clathration with nickel tetra(gamma-picoline) dithiocyanate. In another aspect, the invention relates to the recovery of cyclopentadiene from the solid clathrate by decomposition of the same by treatment with an acid, steam or a heated vapor, or by dissolution in a high-boiling solvent such as ethylene glycol or by a combination of these steps with subsequent hydrocarbon recovery by distillation. In a further aspect of the invention, it relates to the separation of cyclopentadiene present as an impurity in an aliphatic hydrocarbon having, say from 5 carbon atoms to 7 carbon atoms to the molecule, for example, neohexane, isoprene and/or heptane.

It has now been discovered that cyclopentadiene will form a clathrate with nickel tetra(gamma-picoline) dithiocyanate in a manner such that it can be removed from its mixture with a non-clathrate-forming hydrocarbon. Such a separation is found to be of value in the separation of cyclopentadiene from the effluent of the dehydrogenation of isopentane wherein isoprene is formed, the isoprene being later used to make synthetic natural rubber. It has also been found that the clathrate formation here disclosed is useful in separating cyclopentadiene from other aliphatic hydrocarbons, for example, from neohexane, heptane and the like.

It is an object of the present invention to provide a method of separating cyclopentadiene from certain hydrocarbons, especially from hydrocarbons from which it is difficultly separable by ordinary distillation. It is a further object of this invention to separate cyclopentadiene from an aliphatic hydrocarbon having 5–7 carbon atoms to the molecule such as neohexane, isoprene and heptane. It is a still further object of the invention to provide a cyclic operation wherein cyclopentadiene is separated from a hydrocarbon such as an aliphatic hydrocarbon having 5–7 carbon atoms to the molecule. In a still further object of the invention, it provides an improved process for the separation of cyclopentadiene from certain hydrocarbons by clathration in an improved manner.

Other aspects, objects, and the several advantages of the invention are apparent from a study of this disclosure and the appended claims.

According to the present invention, cyclopentadiene is separated from a hydrocarbon with which it is an admixture by selective clathration with nickel tetra(gamma-picoline) dithiocyanate.

The solid clathrate containing the cyclopentadiene is separated from the purified hydrocarbon.

The Werner complex of nickel tetra(gamma-picoline) dithiocyanate and methods of making it are known. One method is addition of gamma-picoline to a water solution of nickel dithiocyanate and filter and dry the precipitated Werner complex.

The invention involves a minimum of two steps, (1) formation of the clathrate, and (2) separation of the clathrate from the purified hydrocarbon. It is the usual procedure to recover the nickel tetra(gamma-picoline) dithiocyanate and reuse it in the process. This may be done by washing the clathrate to removed occluded hydrocarbon, decomposing the complex, separating the cyclopentadiene, and reforming the Werner complex for reuse. Other methods of regenerating the complex for reuse are known and can be employed satisfactorily.

The aliphatic hydrocarbons in which cyclopentadiene will be found as an impurity will be the $C_5$'s–$C_7$'s such as neohexane, isoprene and heptane. The presence of cyclopentadiene is isoprene used for polymerization to rubbery polymers is very undesirable, as the activity of some catalysts is very detrimentally affected.

The clathration step involves essentially only the contacting of the solid nickel tetra(gamma-picoline) dithiocyanate with the aliphatic hydrocarbon contaminated with cyclopentadiene at temperatures in the range of −50° F. to 300° F., although temperatures in the range of 50° F. to 100° F. are ordinarily employed.

Separation of the solid clathrate from the unreacted hydrocarbon is readily effected by filtration, decantation, and the like. Washing the separated clathrate to recover the unclathrated hydrocarbon held by the solid is ordinarily practiced using a paraffin hydrocarbon boiling far enough away from the cathrated hydrocarbon that separation by fractionation is readily effected.

Decomposition of the separated clathrate can be effected by treatment with acids with subsequent recovery of the cyclopentadiene, or the clathrate can be stripped with steam or heated vapor. Also, the complex can be dissolved in a high boiling solvent such as ethylene glycol, and the hydrocarbon recovered by distillation.

After separation of the cyclopentadiene, the nickel tetra(gamma-picoline) dithiocyanate is reformed and reused.

Example I

Fifty ml. of a 22.2 percent cyclopentadiene (by volume) in neohexane was added to 10 grs. of nickel tetra-3-picolino dithiocyanate and allowed to stand overnight. The solid was then filtered and treated with concentrated HCl to destroy the clathrate and recover the hydrocarbon. The recovered hydrocarbon contained 50.6 percent cyclopentadiene.

Example II

Tests were also made using 10 volume percent and 50 volume percent cyclopentadiene in normal heptane. Cyclopentadiene was removed by the nickel tetra(gamma-picoline) dithiocyanate from each of the solutions.

Reasonable variation and modification are possible within the scope of the foregoing disclosure and the appended claims to the invention, the essence of which is that cyclopentadiene can be separated from hydrocarbons, especially from those from which it is ordinarily difficultly separable by distillation, by selective clathration with nickel tetra(gamma-picoline) dithiocyanate.

I claim:
1. A method of separating cyclopentadiene from a hydrocarbon mixture containing the same which comprises the step of effecting a clathration between cyclopentadiene in said mixture and nickel tetra(gamma-picoline) dithiocyanate.
2. A method according to claim 1 wherein said hydrocarbon mixture is composed essentially of cyclopentadiene and neohexane.
3. A method according to claim 1 wherein said hydrocarbon mixture is composed essentially of cyclopentadiene and isoprene.
4. A method according to claim 1 wherein the hydrocarbon mixture essentially contains aliphatic hydrocarbons having 5–7 carbon atoms per molecule.

5. A method of recovering cyclopentadiene from a hydrocarbon from which it is not readily separable by distillation which comprises contacting nickel tetra(gamma-picoline) dithiocyanate with said hydrocarbon containing said cyclopentadiene, separating unreacted hydrocarbon from solid reaction product, and decomposing said product, thus obtaining cyclopentadiene in a recoverable condition.

6. A method for the recovery of cyclopentadiene from one of neohexane, isoprene and heptane, with which it is in admixture, which comprises contacting the admixture with solid nickel tetra(gamma-picoline) dithiocyanate, thus obtaining a clathration reaction and a clathrate product, separating solid clathrate product from unreacted hydrocarbon, washing the separated clathrate to remove unclathrated hydrocarbon held by the solid, decomposing the thus-washed clathrate by treatment with at least one of an acid and a heated vapor, and recovering cyclopentadiene from the thus-decomposed clathrate.

7. A method according to claim 6 wherein the solid separated clathrate is washed with a paraffin hydrocarbon boiling substantially above the hydrocarbon which has been clathrated so that later separation by fractionation is readily effected.

8. A method of separating cyclopentadiene from an admixture with at least one of neohexane, isoprene and heptane which comprises contacting the admixture with solid nickel tetra(gamma-picoline) dithiocyanate forming a solid clathrate reaction product, washing the separated solid clathrate reaction product to recover therefrom unclathrated hydrocarbon, decomposing the thus-washed clathrate by dissolving the same in a high-boiling solvent and then recovering the cyclopentadiene by distillation.

References Cited in the file of this patent
UNITED STATES PATENTS

| | | |
|---|---|---|
| 2,798,891 | Schaeffer | July 9, 1957 |
| 3,013,091 | Fleck et al. | Dec. 12, 1961 |
| 3,029,300 | Schaeffer | Apr. 10, 1962 |